United States Patent
Jacob

(10) Patent No.: US 8,934,589 B2
(45) Date of Patent: Jan. 13, 2015

(54) DEMODULATION IN VAMOS RECEIVERS

(71) Applicant: Telefonaktiebolaget L M Ericsson (publ), Stockholm (SE)

(72) Inventor: Naveen Jacob, Kerala (IN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/904,905

(22) Filed: May 29, 2013

(65) Prior Publication Data
US 2014/0355721 A1   Dec. 4, 2014

(51) Int. Cl.
H04L 27/00   (2006.01)
H04B 1/10   (2006.01)
H04L 25/02   (2006.01)
H04B 15/00   (2006.01)

(52) U.S. Cl.
CPC .............. *H04B 1/10* (2013.01); *H04L 25/0204* (2013.01); *H04B 1/1027* (2013.01); *H04B 15/00* (2013.01)
USPC ............ 375/346; 375/261; 375/285; 375/324

(58) Field of Classification Search
CPC ........ H04B 1/10; H04B 15/00; H04B 1/1027; H04L 25/0204
USPC ......... 375/285, 261, 267, 324–325, 346, 347, 375/349
See application file for complete search history.

(56) References Cited

U.S. PATENT DOCUMENTS

| | | | |
|---|---|---|---|
| 5,933,768 A * | 8/1999 | Skold et al. | 455/296 |
| 8,260,610 B2 | 9/2012 | Juncker et al. | |
| 2002/0021773 A1 * | 2/2002 | Henriksson | 375/347 |
| 2002/0037061 A1 | 3/2002 | Learned | |
| 2002/0044591 A1 * | 4/2002 | Lee et al. | 375/130 |
| 2005/0069066 A1 | 3/2005 | Meyer et al. | |
| 2007/0071150 A1 * | 3/2007 | Yang et al. | 375/347 |
| 2008/0016381 A1 * | 1/2008 | Fitton et al. | 713/320 |
| 2011/0092231 A1 | 4/2011 | Yoo et al. | |
| 2012/0113878 A1 | 5/2012 | Yu et al. | |
| 2012/0244817 A1 | 9/2012 | Das et al. | |
| 2013/0070828 A1 * | 3/2013 | Das et al. | 375/226 |

(Continued)

FOREIGN PATENT DOCUMENTS

EP    2429231 A1    3/2012
WO    2013083833 A1    6/2013

OTHER PUBLICATIONS

Meyer, R. et al. "Efficient receivers for GSM MUROS downlink transmission." IEEE 20th International Symposium on Personal, Indoor and Mobile Radio Communications, Sep. 13-16, 2009, pp. 2399-2403.

(Continued)

Primary Examiner — Jean B Corrielus
(74) Attorney, Agent, or Firm — Coats & Bennett, PLLC

(57) ABSTRACT

A desired signal and interfering signal are transmitted in the same timeslot and on the same frequency using an Adaptive Quadrature Phase Shift Keying (AQPSK) modulated carrier. When the Subchannel Power Imbalance Ratio (SCPIR) for the AQPSK modulated carrier is large and favors the interfering signal, SIC is used to cancel the interfering signal from the received signal. Following interference cancellation, the desired signal is demodulated using two different estimates of the channel and the demodulated soft bits from demodulated soft bits from each demodulation process are combined to obtain a combined estimate.

30 Claims, 4 Drawing Sheets

(56) References Cited

U.S. PATENT DOCUMENTS

2014/0044107 A1* 2/2014 Jacob ............................ 370/336
2014/0148150 A1* 5/2014 Clevorn ......................... 455/423

OTHER PUBLICATIONS

Gerstacker, W. et al. "GSM/EDGE: A mobile communications system determined to stay." AEU International Journal of Electronics and Communications, vol. 65, Issue 8, Aug. 2011, pp. 694-700.
3rd Generation Partnership Project. "Voice Capacity Evolution with Orthogonal Sub Channels." 3GPP TSG GERAN #36, Tdoc GP-071792, Vancouver, Canada, Nov. 12-16, 2007.
Qiu, X. "Multiuser Detection for the Evolution of Speech Services in GSM." Master's Degree Project, Stockholm, Sweden, Jun. 2008.
3rd Generation Partnership Project. "Digital cellular telecommunications system (Phase 2+); Radio transmission and reception (3GPP TS 45.005 version 10.0.0 Release 10)." ETSI TS 145 005, V10.0.0, Apr. 2011. Uploaded into 2 separate sections.
Telefon AB Ericsson et al. "Modulation Detection in VAMOS DL" 3GPP TSG GERAN 44, GP-091985, Agenda item 7.1.5.3.3, Nov. 16-20, 2009, Sophia Antipolis, France, pp. 1-6.
3GPP Global System for Mobile Communications, Digital cellular telecommunications system (Phase 2+); Radio transmission and reception (3GPP TS 45.005 version 11.2.0 Release 11), ETSI TS 145 005 V11.2.0 Feb. 2013, pp. 1-264.
Nokia Siemens Networks et al., "Inclusion of Text Proposals agreed at GERAN#41", 3GPP TSG-GERAN Meeting #42, May 11-15, 2009, pp. 1-33, Shenzhen, China, GP-090989.
Ruder, M. et al., "Receiver Concepts and Resource Allocation for OSC Downlink Transmission", IEEE Transactions on Wireless Communications, Mar. 2014, pp. 1568-1581, vol. 13, No. 3.

* cited by examiner

DEMODULATION IN VAMOS RECEIVERS

TECHNICAL FIELD

The present disclosure relates generally to demodulation by wireless terminals in wireless communication networks and, more particularly, to demodulation by wireless terminals implementing Voice Services Over Adaptive Multiuser Orthogonal Subchannels (VAMOS).

BACKGROUND

The rapid growth of subscribers in Global System for Mobile Communications (GSM) networks has led to need to increase system capacity. Voice Services Over Adaptive Multiuser Orthogonal Subchannels (VAMOS) is one technique for increasing system capacity in a GSM network. VAMOS allows two wireless terminals to be multiplexed into the same time slot on the same frequency. In the downlink, Adaptive Quadrature Phase Shift Keying (AQPSK) is used. The in-phase (I) and quadrature (Q) components of the complex baseband signal are treated as two subchannels. The signal from one user is mapped to one subchannel of an AQPSK modulated carrier and the signal for the other user is mapped to the other subchannel of the AQPSK modulated carrier. Orthogonal training sequences are transmitted on each subchannel and are used by the receivers in the wireless terminals to separate the two signals. More particularly, each wireless terminal uses its assigned training sequence to separate the desired signal transmitted on one subchannel from the interfering signal transmitted on the other subchannel.

VAMOS incorporates a subchannel power control feature that allows the base station to divide the total downlink transmit power unequally between the subchannels of the AQPSK modulated carrier. For example, the base station may allocate power to the subchannels depending on the respective path losses to the paired wireless terminals, referred to hereinafter as a VAMOS pair. The subchannel power control feature makes it possible to pair wireless terminals with different channel conditions to increase the VAMOS coverage area and to increase the number of possible VAMOS pairs. Thus, extra power can be allocated to one of the subchannels at the expense of the paired subchannel. When the power imbalance is large and favors the interfering signal, Successive Interference Cancellation (SIC) can be used to subtract the interfering signal from the received signal before demodulating the desired signal. However, the interference attributable to the interfering signal cannot be completely removed. Even with SIC, demodulation performance may be degraded when the power imbalance ratio is large.

Joint demodulation (JD) receivers have also been used for VAMOS receivers. In terms of performance, a JD receiver typically outperforms an SIC receiver. However, the computational complexity makes it difficult to implement a JD in a VAMOS receiver. Therefore, VAMOS receivers in wireless terminals typically use SIC rather than JD. Accordingly, there remains a need to improve demodulation performance in a VAMOS receiver using SIC.

SUMMARY

The present disclosure provides methods and apparatus to improve demodulation performance in a VAMOS receiver using SIC. When VAMOS is used, the interfering signal and desired signal are affected by the same channel. Thus, the interfering symbols may be used for channel estimation. When the Subchannel Power Imbalance Ratio (SCPIR) for the AQPSK modulated carrier is large and favors the interfering signal, SIC is used to cancel the interfering signal from the received signal. Following interference cancellation, the desired signal is demodulated using two independent estimates of the channel and the demodulated soft bits from each demodulation process are combined to obtain combined demodulated soft bits.

Exemplary embodiments of the disclosure comprise methods implemented by a receiver in a wireless terminal of demodulating a received signal. A desired signal is received on a first subchannel of a quadrature modulated carrier. An interfering signal is received on a second subchannel of the quadrature modulated carrier. The receiver computes a power imbalance ratio indicative of a power distribution between the first and second subchannels. If the power imbalance ratio meets a threshold, the receiver generates a first channel estimate for the first subchannel and demodulates the desired signal using the first channel estimate to obtain first demodulated soft bits corresponding to the desired signal. The receiver further generates a second channel estimate for the first subchannel based on the interfering signal, and demodulates the desired signal using the second channel estimate to obtain second demodulated soft bits corresponding to the desired signal. The receiver further combines the first and second demodulated soft bits to obtain combined demodulated soft bits.

In some embodiments of the method, receiving the desired signal on a first subchannel of a quadrature modulated carrier comprises receiving the desired signal on one of an in-phase component and a quadrature component of the quadrature modulated carrier, and wherein receiving the interfering signal on a second subchannel of the quadrature modulated carrier comprises receiving the interfering signal on the other one of the in-phase component and the quadrature component of the quadrature modulated carrier.

In some embodiments of the method, generating the second channel estimate from training symbols in the interfering signal comprises generating a third channel estimate for the second subchannel from the training symbols in the interfering signal, and transforming the third channel estimate to obtain the second channel estimate.

In some embodiments of the method, generating the second channel estimate based on the interfering signal comprises generating the second channel estimate from demodulated soft bits corresponding to the interfering signal.

In some embodiments of the method, generating the second channel estimate from the demodulated soft bits corresponding to the interfering signal comprises generating a third channel estimate for the second subchannel using demodulated soft bits corresponding to the interfering signal, and transforming the third channel estimate to obtain the second channel estimate.

In some embodiments of the method, generating the third channel estimate for the second subchannel using demodulated soft bits corresponding to the interfering signal comprises generating a third channel estimate using demodulated soft bits located near an end of one or more data bursts.

In some embodiments of the method, generating the first channel estimate comprises generating the first channel estimate from training symbols in the interfering signal.

In some embodiments of the method, generating the second channel estimate based on the interfering signal comprises generating the second channel estimate from demodulated soft bits corresponding to the interfering signal.

In some embodiments of the method, generating the second channel estimate from demodulated soft bits corresponding to the interfering signal comprises generating a third channel estimate for the second subchannel using demodulated soft bits corresponding to the interfering signal, and transforming the third channel estimate to obtain the second channel estimate.

In some embodiments of the method, demodulating the desired signal using the first channel estimate comprises whitening the desired signal based on the first channel estimate to obtain a first whitened desired signal, and demodulating the first whitened desired signal.

In some embodiments of the method, demodulating the desired signal using the second channel estimate comprises whitening the desired signal based on the second channel estimate to obtain a second whitened desired signal, and demodulating the second whitened desired signal.

In some embodiments, the method further comprises canceling interference in the desired signal attributable to the interfering signal before demodulating the desired signal using either the first channel estimate or the second channel estimate.

Other embodiments of this disclosure comprise a wireless terminal. In one embodiment, the wireless terminal comprises receiver circuits configured to receive a quadrature modulated carrier containing a desired signal on a first subchannel of the quadrature modulated carrier and an interfering signal on a second subchannel of the quadrature modulated carrier. The wireless communication circuit further comprises a processing circuit configured to compute a power imbalance ratio indicative of the power distribution between the first and second subchannels. If the power imbalance meets a threshold, the processing circuit is configured to generate a first channel estimate for the first subchannel, demodulate the desired signal using the first channel estimate to obtain first demodulated soft bits corresponding to the desired signal, generate a second channel estimate for the first subchannel based on the interfering signal, demodulate the desired signal using the second channel estimate to obtain second demodulated soft bits corresponding to the desired signal, and combine the first and second demodulated soft bits to obtain combined demodulated soft bits.

In some embodiments of the wireless terminal, the receiver circuits are configured to receive the desired signal on one of an in-phase component and a quadrature component of the quadrature modulated carrier, and to receive the interfering signal on the other one of the in-phase component and the quadrature component of the quadrature modulated carrier.

In some embodiments of the wireless terminal, the processing circuit comprises a first channel estimation circuit configured to generate the first channel estimate from training symbols in the desired signal.

In some embodiments of the wireless terminal, the processing circuit further comprises a second channel estimation circuit configured to generate the second channel estimate from training symbols in the interfering signal.

In some embodiments of the wireless terminal, the second channel estimation circuit is configured to generate a third channel estimate for the second subchannel from the training symbols in the interfering signal, and transform the third channel estimate to obtain the second channel estimate.

In some embodiments of the wireless terminal, the second channel estimation circuit is configured to generate the second channel estimate using demodulated soft bits corresponding to the interfering signal.

In some embodiments of the wireless terminal, the second channel estimation circuit is configured to generate the second channel estimate from demodulated soft bits located near an end of one or more data bursts.

In some embodiments of the wireless terminal, the second channel estimation circuit is configured to generate a third channel estimate for the second subchannel using demodulated soft bits corresponding to the interfering signal, and transform the third channel estimate to obtain the second channel estimate.

In some embodiments of the wireless terminal, the first channel estimation circuit is configured to generate the first channel estimate from training symbols in the interfering signal.

In some embodiments of the wireless terminal, the processing circuit further comprises a first whitening filter to whiten the desired signal using the first channel estimate to obtain a first whitened desired signal and a demodulator to demodulate the first whitened desired signal.

In some embodiments of the wireless terminal, the processing circuit further comprises a whitening filter to whiten the desired signal using the second channel estimate to obtain a second whitened desired signal and a demodulator to demodulate the second whitened desired signal.

In some embodiments of the wireless terminal, the processing circuit further comprises an interference cancellation circuit configured to cancel interference in the desired signal attributable to the interfering signal before demodulating the desired signal using either the first channel estimate or the second channel estimate.

DETAILED DESCRIPTION

Figure 1:
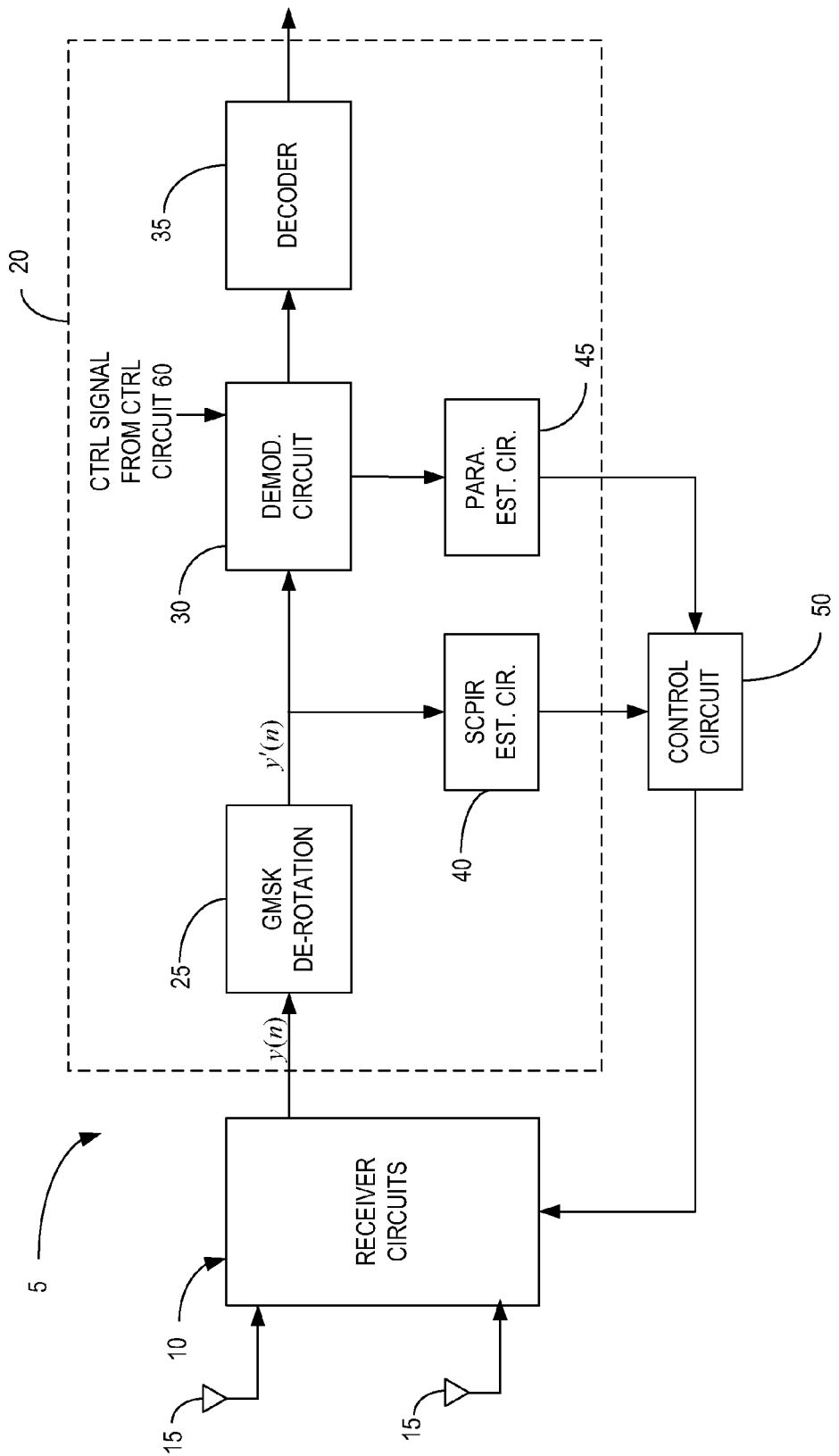
FIG. 1 illustrates an exemplary wireless terminal according to one embodiment.

Referring now to FIG. 1, a wireless terminal 5 according to one exemplary embodiment of the disclosure is shown. The wireless terminal 5 is configured to operate according to the Global System for Mobile Communication (GSM) standard. Those skilled in the art will appreciate that embodiments of this disclosure may be configured to operate according to other wireless communication standards such as Long Term Evolution (LTE), Wide Band Code Division Multiple Access (WCDMA), Worldwide Interoperability for Microwave Access (WIMAX), or other wireless communication standards now known or later developed.

The wireless terminal 5 is configured to implement Voice Services Over Adaptive Multi-user Orthogonal Subchannels (VAMOS). VAMOS allows two wireless terminals 5 to be multiplexed in the same time slot on the same frequency. In the downlink, Adaptive Quadrature Phased Shift Keying (AQPSK) is used. The in-phase and quadrature components of the complex baseband signal are treated as separate subchannels. The signal for one wireless terminal 5 is mapped to one subchannel (i.e., the in-phase component of the complex baseband signal), and the signal for the paired wireless terminal 5 is mapped to the second subchannel (i.e., the quadrature component of the complex baseband signal). Orthogonal training sequences are transmitted on each subchannel and are used by the wireless terminal 5 to separate the desired signal (i.e., the signal intended for the wireless terminal 5) from the interfering signal (i.e., the signal intended for another wireless terminal 5). In GSM networks, a training sequence comprising 26 training symbols is transmitted in the middle of each burst. A data block comprises four bursts, so there are 114 training symbols in each data block. The wireless terminal 5 can use the training sequences transmitted on each subchannel to separate the two signals.

The wireless terminal 5 comprises receiver circuits 10 coupled to one or more antennas 15 for receiving signals over a wireless communication channel, a processing circuit 20 for processing signals received by the wireless terminal 5, and a control circuit 50 for controlling the operation of the wireless terminal 5 as hereinafter described. Those skilled in the art will appreciate that the wireless terminal 5 may include additional components that are not illustrated. For example, the wireless terminal 5 may include transmitter circuits for transmitting signals and a processing circuit for processing the transmitted signal.

The receiver circuits 10 may comprise one or more receiver branches. Each receiver branch comprises analog circuits for amplifying, filtering and down-converting received signals to a baseband frequency. An analog-to-digital converter converts the analog baseband signal received on each receiver branch to digital form for input to the processing circuit 20. After A-to-D conversion, the received signal y(n) is input to the processing circuit 20.

The processing circuit 20 comprises a Gaussian Minimum Shift Keying (GMSK) de-rotation circuit 25, a demodulation circuit 30, a decoder 35, a Subchannel Power Imbalance Ratio (SCPIR) estimation circuit 40, and a parameter estimation circuit 45. The processing circuit 20 may be implemented by one or more microprocessors, microcontrollers, hardware, firmware, or a combination thereof. The processing circuit 20 also includes memory for storing programs and data used by the processing circuit 20. The memory may comprise both Random Access Memory (RAM) and Read-Only Memory (ROM), and may be implemented, for example, as one or more discrete devices, stacked devices, or removable devices, such as a flash drive or memory stick, or may be integrated with one or more microprocessors.

The GMSK de-rotation circuit 25 de-rotates the received signal to produce a de-rotated received signal $y_{(n)}'$. The de-rotated received signal $y_{(n)}'$ is input to the demodulation circuit 30 and SCPIR estimation circuit 40. The function of the demodulation circuit 30 is to demodulate the desired signal on one of the subchannels. The SCPIR estimation circuit 40 estimates the SCPIR. The estimated SCPIR is provided to the control circuit 50, which controls the wireless terminal 5.

Depending on the SCPIR, the demodulation circuit 30 may perform Successive Interference Cancellation (SIC) before demodulating the desired signal. The demodulated soft bits output from the demodulation circuit 30 are fed to a decoder 35. The decoder 35 decodes the demodulated soft bits to correct any errors that may have occurred during transmission and to generate a decoded bit stream.

The parameter estimation circuit 45 estimates receiver control parameters, such as Doppler shift, frequency offset, timing error, etc., from demodulated soft bits output by the demodulation circuit 30. Depending on the SCPIR, the demodulated soft bits output to the parameter estimation circuit 45 may comprise the demodulated soft bits corresponding to the desired signal (when the SCPIR does not meet the threshold) or the demodulated soft bits corresponding to the interfering signal (when the SCPIR meets the threshold).

Co-pending U.S. patent application Ser. No. 13/792,509 describes techniques for parameter estimation in a VAMOS receiver.

The control circuit 50 controls the overall operation of the wireless terminal 5. The control circuit 50 may be implemented by one or more microprocessors, microcontrollers, hardware, firmware, or a combination thereof. The processing circuit 20 also includes memory for storing programs and data used by the processing circuit 20. Memory may comprise both Random Access Memory (RAM) and Read-Only Memory (ROM), and may be implemented, for example, as one or more discrete devices, stacked devices, or removable devices, such as a flash drive or memory stick, or may be integrated with one or more microprocessors. Processing and memory resources used by the control circuit 50 may be shared with the processing circuit 20. For example, the control circuit 50 and processing circuit 20 may be embodied in a single microprocessor.

The control functions performed by the control circuit 50 include controlling the demodulation circuit 30 and controlling the receiver circuits 10. To perform these functions, the control circuit 50 receives the SCPIR estimate from the SCPIR estimation circuit 40, and receives the estimated receiver control parameters from the parameter estimation circuit 45. The control circuit 50 controls the demodulation circuit 30 depending on the SCPIR. More particularly, the control circuit 50 is configured to send a control signal to the demodulation circuit 30 to enable/disable SIC depending on the SCPIR. In one embodiment, SIC is disabled when the SCPIR does not meet a threshold and is enabled when the SCPIR meets a threshold.

When VAMOS is used, the received signal y(n) can be modeled as:

$$y(n) = \sum_{k=-\infty}^{+\infty} h(k) \left\{ \frac{\alpha}{\sqrt{2}} a_1(n-k) + j \sqrt{\frac{2-\alpha^2}{2}} a_2(n-k) \right\} + v(n) + w(n) \quad \text{Eq. (1)}$$

where h(k) is the Channel Impulse Response (CIR), $a_1(n)$ are the bits of the desired signal transmitted on the first subchannel, $a_2(n)$ are the bits of the interfering signal transmitted in the second subchannel, v(n) is the interference, and w(n) is Additive White Gaussian Noise (AWGN). The quantity a is a shape parameter that determines the Subchannel Power Imbalance Ratio (SCPIR) in the subchannels. The SCPIR is given by:

$$SCPIR = 10\log_{10}\left(\frac{2-\alpha^2}{\alpha^2}\right) \quad \text{Eq. (2)}$$

The SCPIR is used to indicate when SIC is needed. Generally, the SCPIR is compared to a threshold that indicates when the power for the interfering signal exceeds the power for the desired signal by a predetermined amount. If the SCPIR does not meet the threshold, SIC is disabled. If the SCPIR meets the threshold, SIC is enabled. For example, when the threshold is −10 db, the threshold is met when the SCPIR is −12 dB and is not met when the SCPIR is −8 dB.

The received signal $y_n$ sampled at the symbol rate can be written in terms of an L-tap complex-valued channel $$h_{k=0}^{L-1},$$

the binary symbols received on a first subchannel $$(a_n)_{n=0}^N,$$

the binary symbols received on a second subchannel, $$(b_n)_{n=0}^N,$$

and the rotation angle θ (θ=π/2) for the typical GMSK modulation used in GSM) and complex-valued noise plus interference ($w_n$):

$$y_n = \frac{\alpha}{\sqrt{2}} \sum_{k=0}^{L-1} h_k e^{(n-k)j\theta} a_{n-k} + j\frac{\sqrt{2-\alpha^2}}{\sqrt{2}} \sum_{k=0}^{L-1} h_k e^{(n-k)j\theta} b_{n-k} + w_n \quad \text{Eq. (3)}$$

After de-rotation by θ, the received signal is given by:

$$y'_n = \frac{\alpha}{\sqrt{2}} \sum_{k=0}^{L-1} h'_k a_{n-k} + j\frac{\sqrt{2-\alpha^2}}{\sqrt{2}} \sum_{k=0}^{L-1} h'_k b_{n-k} + w'_n \quad \text{Eq. (4)}$$

where the prime indicates that the signal and the channel taps have been de-rotated. Taking real and imaginary parts in Equation (4), and using the fact that the symbols $(a_n)_{n=0}^N$ and $(b_n)_{n=0}^N$ are real-valued, we obtain the following pair of equations:

$$\Re(r'_n) = \quad \text{Eq. (5)}$$
$$\frac{\alpha}{\sqrt{2}} \sum_{k=0}^{L-1} \Re(h'_k) a_{n-k} - \frac{\sqrt{2-\alpha^2}}{\sqrt{2}} \sum_{k=0}^{L-1} \Im(h'_k) b_{n-k} + \Re(w'_n),$$

$$\Im(r'_n) = \quad \text{Eq. (6)}$$
$$\frac{\alpha}{\sqrt{2}} \sum_{k=0}^{L-1} \Im(h'_k) a_{n-k} + \frac{\sqrt{2-\alpha^2}}{\sqrt{2}} \sum_{k=0}^{L-1} \Re(h'_k) b_{n-k} + \Im(w'_n)$$

Equations (5) and (6) can be rewritten in matrix form as:

$$\vec{y}_n = \sum_{k=0}^{L-1} H_k \begin{bmatrix} a_{n-k} \\ b_{n-k} \end{bmatrix} + \vec{w}_n \quad \text{Eq. (7)}$$

where $$\vec{y}_n = \begin{bmatrix} \Re(r'_n) \\ \Im(r'_n) \end{bmatrix}, \quad \text{Eq. (8)}$$

$$H_k = \begin{bmatrix} \frac{\alpha}{\sqrt{2}} \Re(h'_k) & -\frac{\sqrt{2-\alpha^2}}{\sqrt{2}} \Im(h'_k) \\ \frac{\alpha}{\sqrt{2}} \Im(h'_k) & \frac{\sqrt{2-\alpha^2}}{\sqrt{2}} \Re(h'_k) \end{bmatrix}, \text{ and} \quad \text{Eq. (9)}$$

$$\vec{w}_n = \begin{bmatrix} \Re(w'_n) \\ \Im(w'_n) \end{bmatrix} \quad \text{Eq. (10)}$$

For the desired signal, the channel estimate $H_1$ is given by:

$$H_1 = \begin{bmatrix} \frac{\alpha}{\sqrt{2}} \Re(h'_k) \\ \frac{\alpha}{\sqrt{2}} \Im(h'_k) \end{bmatrix} \quad \text{Eq. (11)}$$

For the interfering signal, the channel estimate $H_2$ is given by:

$$H_2 = \begin{bmatrix} -\frac{\sqrt{2-\alpha^2}}{\sqrt{2}} \Im(h'_k) \\ \frac{\sqrt{2-\alpha^2}}{\sqrt{2}} \Re(h'_k) \end{bmatrix} \quad \text{Eq. (12)}$$

Given the channel estimate $H_2$ for the second subchannel derived from training symbols in the interfering signal, the channel estimate $H_1$ for the first subchannel can be derived as follows:

$$\Re(H1) = \frac{\alpha}{\sqrt{2-\alpha^2}} \Im(H2) \quad \text{Eq. (13)}$$

$$\Im(H1) = \frac{\alpha}{\sqrt{2-\alpha^2}} \Re(H2) \quad \text{Eq. (14)}$$

Embodiments of the disclosure provide techniques for demodulating the desired signal when the SCPIR is large and favors the interfering signal. In this case, two independent channel estimates of the channel are generated: one from the training sequence in the desired signal after SIC and one from the training sequence in the interfering signal before SIC. The desired signal is demodulated using the two independent estimates of the channel and the demodulated soft bits from each demodulation process are combined to obtain combined demodulated soft bits.

Figure 2:
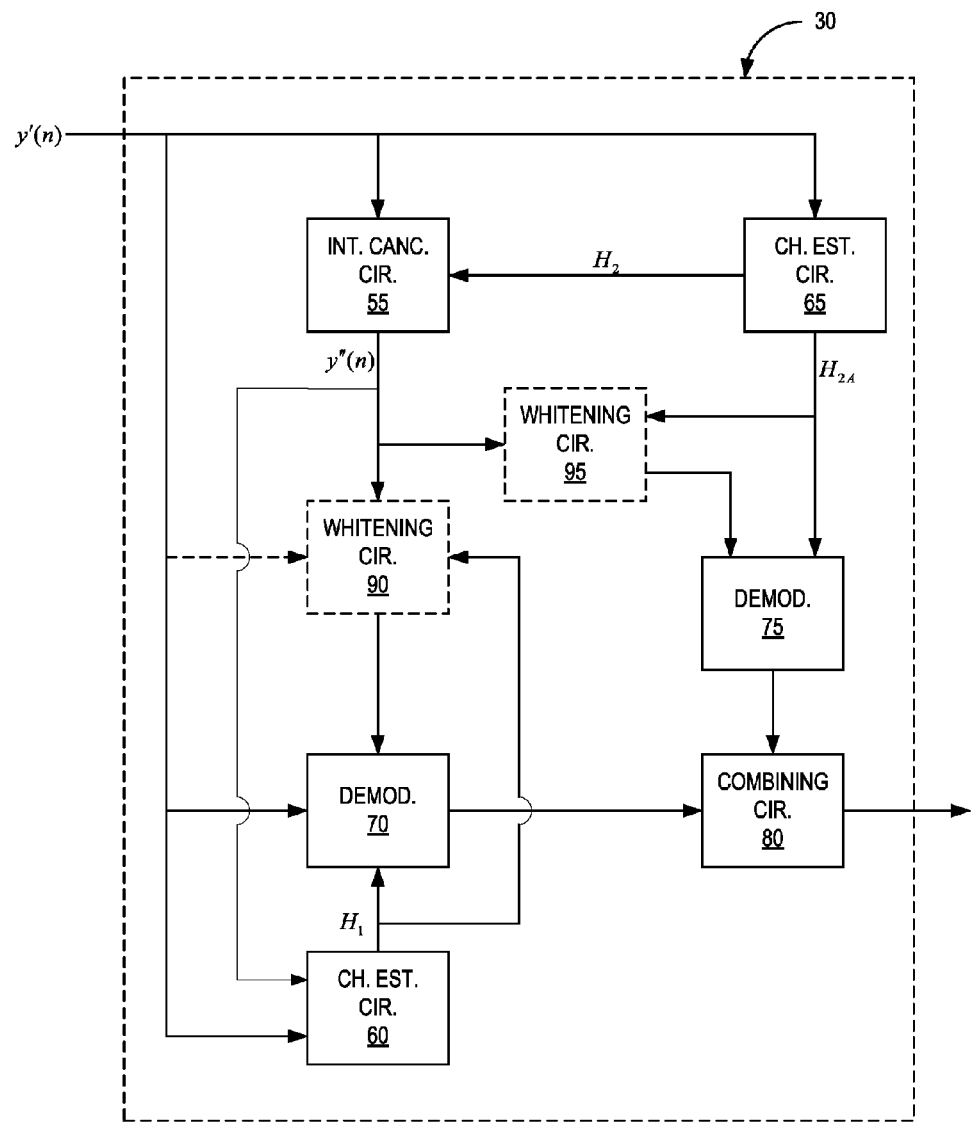
FIG. 2 illustrates the main functional elements of a demodulation circuit for the wireless terminal in a first embodiment.

FIG. 2 illustrates a demodulation circuit 30 according to one exemplary embodiment of this disclosure. The demodulation circuit 30 is configured to selectively perform SIC depending on the SCPIR. The demodulation circuit 30 comprises an interference cancellation circuit 55, channel estimation circuit 60, demodulator 70, channel estimation circuit 65, demodulator 75, and combining circuit 80. The de-rotated received signal y'(n) is input to the interference cancellation circuit 55, channel estimation circuit 60, channel estimation circuit 65, and demodulator 70. In this embodiment, the channel estimation circuit 65 generates a least square channel estimate $H_2$ for the second subchannel from the training sequence in the interfering signal and provides the channel estimate $H_2$ to the interference cancellation circuit 55.

The interference cancellation circuit 55, when enabled, performs successive interference cancellation (SIC). Interference cancellation techniques are well-known in the art and are not described in detail herein. To briefly summarize, the interference cancellation circuit 55 demodulates the interfering signal to obtain demodulated soft bits. The interfering signal is reconstructed by computing the convolution of the demodulated soft bits and the channel estimate $H_2$. The reconstructed interfering signal is subtracted from the de-rotated received signal y'(n) to obtain the reduced interference signal y"(n). The reduced interference signal y"(n) is provided to the channel estimation circuit 60, demodulator 70 and the demodulator 75.

The demodulator 60 is configured to demodulate the desired signal using a channel estimate $H_1$ for the first subchannel generated by the first channel estimation circuit 60. When SIC is disabled, the de-rotated received signal y'(n) is input to the channel estimation circuit 60 and demodulator 70. As previously noted, SIC is disabled by the control circuit 50 when the SCPIR is less than a threshold. A low SCPIR indicates that the interference from the interfering signal is low enough to enable accurate channel estimation and good demodulation performance. In this case, the channel estimation circuit 60 generates a least square channel estimate $H_1$ for the first subchannel from the training sequence contained in the desired signal. The demodulator 70 demodulates the desired signal using the channel estimate $H_1$ provided by the channel estimation circuit 60 and the de-rotated receiver signal) $y_{(n)}$' to obtain first demodulated soft bits representing the desired signal.

When SIC is enabled, the reduced interference signal y"(n) from the interference cancellation circuit 55 is input to the channel estimation circuit 60 and demodulator 70. SIC is enabled by the control circuit 50 when the SCPIR meets a threshold indicating that the power of the interfering signal exceeds the power of the desired signal by a predetermined amount. This power imbalance prevents accurate channel estimation and degrades demodulation performance. The operation of the channel estimation circuit 60 and demodulator 70 is the same, the difference being that the reduced interference signal y"(n) is used to perform channel estimation and demodulation rather than the de-rotated received signal y'(n).

The demodulator 75 is configured to demodulate desired signal using a channel estimate $H_2$ for the first subchannel generated by the second channel estimation circuit 65 from the training sequence in the interfering signal. When SIC is enabled, the de-rotated received signal y'(n) is input to the channel estimation circuit 65. The channel estimation circuit 65 generates a least square channel estimate $H_2$ for the second subchannel from the training sequence in the interfering signal and outputs the channel estimate $H_2$ to the interference cancellation circuit 55. The channel estimation circuit 65 transforms the channel estimate $H_2$ according to Equations (13) and (14) to obtain a channel estimate $H_{2A}$ for the first subchannel that is input to the demodulator 75. The interference cancellation circuit 55 uses the channel estimate $H_2$ to reconstruct the interfering signal from demodulated soft bits, which is then subtracted from the de-rotated received signal y'(n) to obtain the reduced interference signal y"(n). The reduced interference signal y"(n) is input to the demodulator 75. The demodulator 75 demodulates the desired signal using the reduced interference signal y"(n) and the channel estimate $H_{2A}$ provided by the channel estimation circuit 65 to obtain second demodulated soft bits. The channel estimation circuit 65 and demodulator 75 may be disabled when SIC is disabled.

The demodulated soft bits output by demodulator 70 and demodulator 75 are input to the combining circuit 80. When SIC is disabled, the combining circuit 80 outputs the demodulated soft bits from demodulator 70 to the decoder 35. When SIC is enabled, the combining circuit 80 combines the demodulated soft bits from demodulators 70 and 75 to obtain combined demodulated soft bits. For example, the combining circuit may perform maximal ratio combining (MRC).

In some embodiments, the demodulation circuit 30 may further include whitening filters 90 and 95. When SIC is disabled, the whitening filter 90 uses the channel estimate $H_1$ to whiten the de-rotated received signal y'(n) before it is input to the demodulator 70. When SIC is enabled, the whitening filter 90 uses the channel estimate $H_1$ to whiten the reduced interference signal y"(n) before it is input to the demodulator 70. Whitening filter 95 uses the channel estimate $H_{2A}$ to whiten the reduced interference signal y"(n) before it is input to the demodulator 75.

The techniques described above can be used to improve demodulation performance in a high Doppler scenarios, where the received signal y(n) passes through a fast fading channel. In this situation, the channel conditions may change rapidly during the transmission of a data burst. Because the training sequences are transmitted in the middle of each data burst, the demodulated soft bits near the center of the data bursts will contain fewer errors than the demodulated soft bits near the ends of the data bursts. The increasing number of bit errors near the ends of the data bursts is attributable to changes in the channel conditions over the duration of the data burst.

To mitigate the effects of the fast fading channel, two independent estimates of the channel may be obtained: one near the center of the data burst and another near one or both of the ends of the data burst. The channel estimate near the middle of the data burst may be obtained from the training sequence in the desired signal after SIC, from the training sequence in the interfering signal before SIC, or both. The channel estimate for the ends of the data burst may be obtained from demodulated soft bits corresponding to the interfering signal. Demodulating the desired signal using two channel estimates derived from bits in different parts of the data burst and soft combining the resulting soft bits yields a flatter bit error rate (BER) curve over the duration of the data burst and provides better performance.

Figure 3:
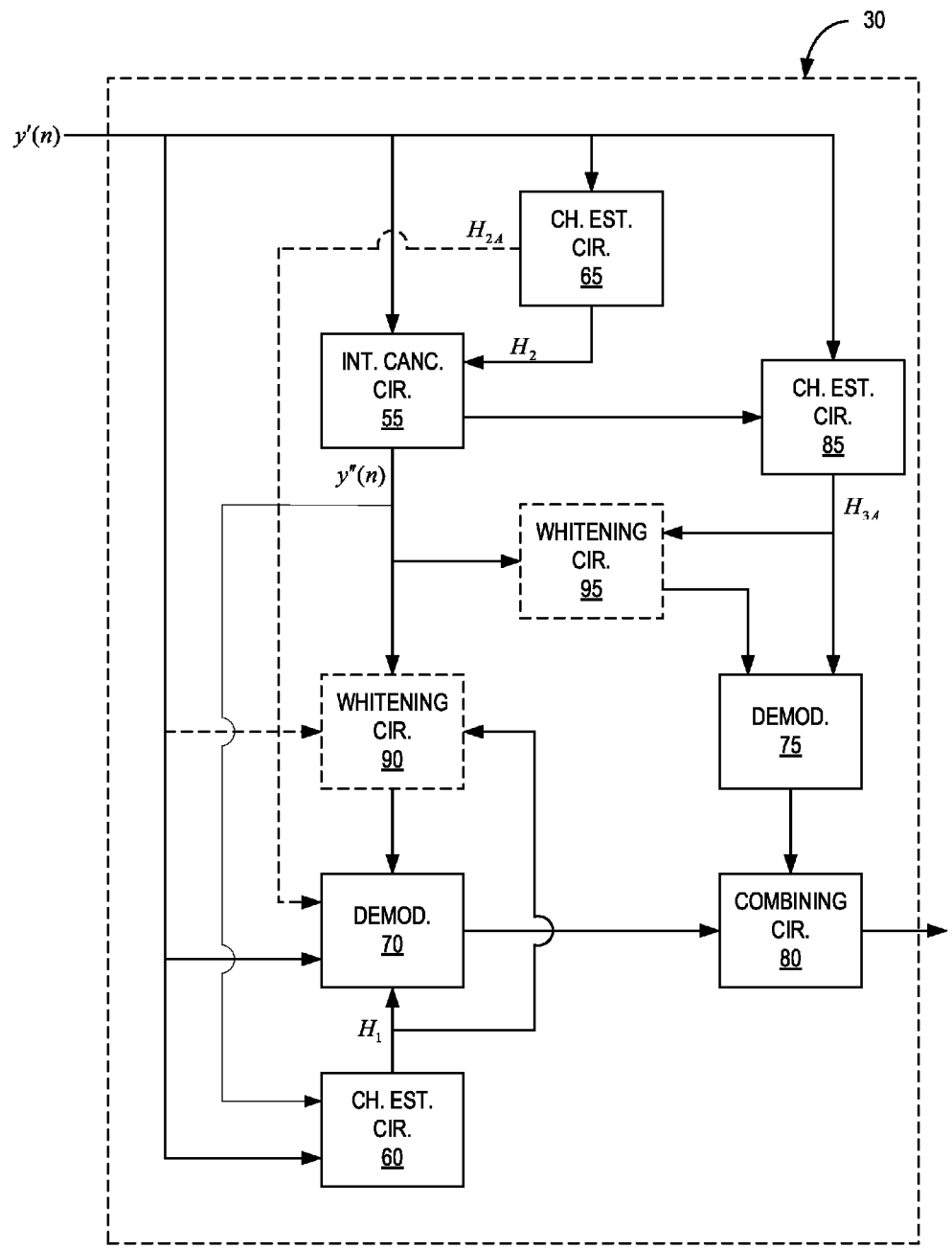
FIG. 3 illustrates the main functional elements of a demodulation circuit for the wireless terminal in a second embodiment.

FIG. 3 illustrates a demodulation circuit 30 according to another embodiment of this disclosure. The demodulation circuit 30 shown in FIG. 3 is similar to the embodiment shown in FIG. 2. Therefore, like reference numbers are used to indicate like elements. The demodulation circuit 30 comprises an interference cancellation circuit 55, channel estimation circuit 60, demodulator 70, channel estimation circuit 65, demodulator 75, channel estimation circuit 85, and combining circuit 80. The de-rotated received signal y'(n) is input to the interference cancellation circuit 55, channel estimation circuit 60, channel estimation circuit 65, demodulator 70, and channel estimation circuit 85. In this embodiment, the channel estimation circuit 65 generates a least square channel estimate $H_2$ for the second subchannel from the training sequence in the interfering signal and provides the channel estimate $H_2$ to the interference cancellation circuit 55.

The interference cancellation circuit 55, when enabled, performs successive interference cancellation (SIC) as previously described. The de-rotated received signal y'(n), along with a channel estimate $H_2$ provided by the channel estimation circuit 65, are input to the interference cancellation circuit 55. The interference cancellation circuit 55 regenerates the interfering signal and subtracts it from the de-rotated received signal y'(n) to obtain the reduced interference signal y"(n). The reduced interference signal y"(n) is provided to the channel estimation circuit 60, demodulator 70 and demodulator 75.

The demodulator 70 is configured to demodulate the desired signal using a channel estimate $H_1$ for the first subchannel for the desired signal generated by the first channel estimation circuit 60. When SIC is disabled, de-rotated received signal y'(n) is input to the channel estimation circuit 60 and demodulator 70. The channel estimation circuit 60 generates a least square channel estimate $H_1$ for the first subchannel from the training sequence contained in the desired signal, which are transmitted in the middle of each data burst. The demodulator 70 demodulates the desired signal using the channel estimate $H_1$ provided by the channel estimation circuit 60 and the de-rotated received signal y'(n) to obtain first demodulated soft bits representing the desired signal. When SIC is enabled, the reduced interference signal y"(n) from the interference cancellation circuit 55 is input to the channel estimation circuit 60 and demodulator 70. The operation of the channel estimation circuit 60 and demodulator 70 is the same, the difference being that the reduced interference signal y"(n) is used for channel estimation and demodulation rather than the de-rotated received signal y'(n).

The demodulator 75 is configured to demodulate desired signal using a channel estimate $H_{3A}$ for the first subchannel generated by the channel estimation circuit 85. When SIC is enabled, the de-rotated received signal y'(n) is input to the channel estimation circuit 85 along with demodulated soft bits corresponding to the interfering signal provided by the interference cancellation circuit 55. The channel estimation circuit 85 generates a least square channel estimate $H_3$ for the second subchannel from the demodulated soft bits and the de-rotated received signal y'(n). In one exemplary embodiment, the channel estimation circuit 85 uses demodulated soft bits near the ends of each data burst to derive the channel estimate $H_3$. The channel estimation circuit 85 transforms the channel estimate $H_3$ for the second subchannel according to Equations (13) and (14) to obtain the channel estimate $H_{3A}$ for the first subchannel that is input to the demodulator 75. The demodulator 75 demodulates the desired signal using the reduced interference signal y"(n) and the channel estimate $H_{3A}$ provided by the channel estimation circuit 65 to obtain second demodulated soft bits. The channel estimation circuit 85 and demodulator 75 may be disabled when SIC is disabled.

The demodulated soft bits output by demodulator 70 and demodulator 75 are input to the combining circuit 80. When SIC is disabled, the combining circuit 80 outputs the demodulated soft bits from demodulator 70 to the decoder 35. When SIC is enabled, the combining circuit 80 combines the demodulated soft bits from demodulators 70 and 75 to obtain combined demodulated soft bits. For example, the combining circuit may perform maximal ratio combining (MRC).

In some embodiments, the demodulation circuit 30 shown in FIG. 3 may further include whitening filters 90 and 95. When SIC is disabled, the whitening filter 90 uses the channel estimate $H_1$ to whiten the de-rotated received signal y'(n) before it is input to the demodulator 70. When SIC is enabled, the whitening filter 90 uses the channel estimate $H_1$ to whiten the reduced interference signal y"(n) before it is input to the demodulator 70. Whitening filter 95 uses the channel estimate $H_{3A}$ to whiten the reduced interference signal y"(n) before it is input to the demodulator 75.

In some embodiments, the demodulator 70 shown in FIG. 3 may use a channel estimate $H_{2A}$ for the first subchannel generated by the channel estimation circuit 65 in place of or in combination with the channel estimate $H_1$ from the channel estimation circuit 60. As previously noted, the channel estimation circuit 65 derives a channel estimate $H_2$ for the second subchannel from the training sequence in the interfering signal. When the SCPIR meets the threshold, the training sequence in the interfering signal may provide a more accurate estimate of the channel. The channel estimation circuit 65 can transform the channel estimate $H_2$ according to Equations (13) and (14) to obtain an independent channel estimate $H_{2A}$ for the first subchannel. In other embodiments, a joint channel estimate may be derived by combining the channel estimate $H_1$ from the channel estimation circuit 60 with the channel estimate $H_{2A}$ channel estimation circuit 65.

Figure 4:
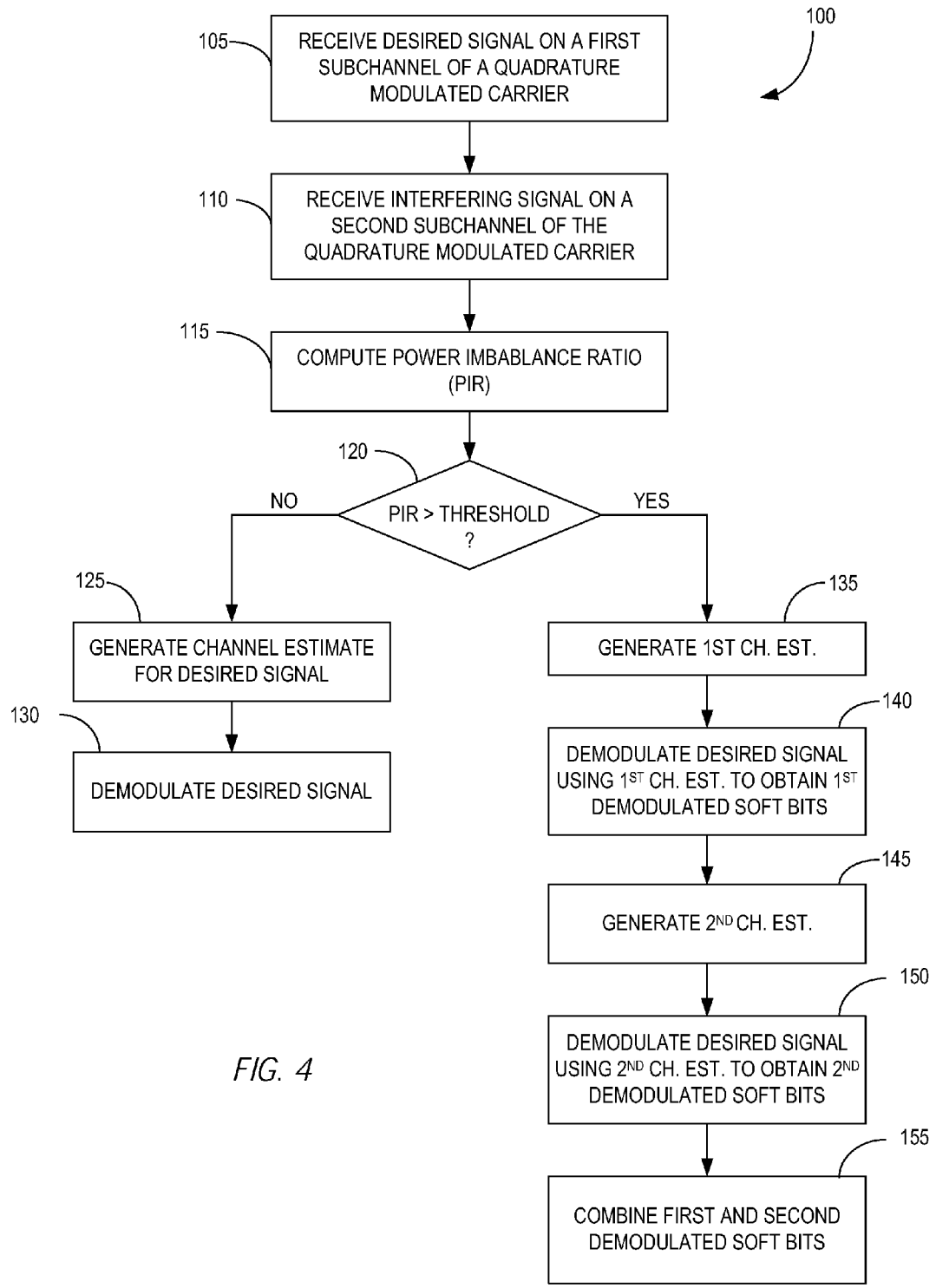
FIG. 4 illustrates an exemplary method of demodulating a received signal.

FIG. 4 illustrates an exemplary method 100 according to one exemplary embodiment. The method 100 may be implemented in a wireless terminal 5, such as a mobile phone. The wireless terminal 5 receives a desired signal on a first subchannel of a quadrature modulated carrier (block 105). The wireless terminal 5 also receives an interfering signal on a second subchannel of the quadrature modulated carrier (block 110). The wireless terminal 5 computes a power imbalance ratio (e.g., SCPIR) and compares the power imbalance ratio to a threshold (blocks 115, 120). If the Power Imbalance Ratio does not meet the threshold, SIC is disabled. In this case, the wireless terminal 5 generates a channel estimate from the training sequence in the desired signal (block 125) and demodulates the desired signal (block 130). If the power imbalance ratio meets the threshold, SIC is enabled. In this case, the wireless terminal 5 generates a first channel estimate and demodulates the desired signal using the first channel estimate to obtain first demodulated soft bits (blocks 135, 140). The wireless terminal 5 then generates a second channel estimate and demodulates the desired signal using the second channel estimate to obtain second demodulated soft bits (145, 150). The wireless terminal 5 combines the first and second demodulated soft bits to obtain combined demodulated soft bits (block 155).

In one exemplary embodiment, the first channel estimate is generated from the training sequence in the desired signal (block 135). The second channel estimate is generated from the training sequence in the interfering signal (block 145). In other embodiments, the first channel estimate is generated from the training sequence in the desired signal, the interfering signal, or both (block 135). The second channel estimate is generated from demodulated soft bits corresponding to the interfering signal (block 145). In some embodiments, the second channel estimate may be derived from demodulated soft bits near the ends of each data burst.

Thus, the foregoing description and the accompanying drawings represent non-limiting examples of the methods and apparatus taught herein. As such, the present disclosure is not limited by the foregoing description and accompanying drawings. Instead, the present disclosure is limited only by the following claims and their legal equivalents.

What is claimed is:

1. A method of receiving a signal, the method implemented by a wireless terminal in a wireless communication network and comprising:

receiving a desired signal in one or more data bursts on a first subchannel of a quadrature modulated carrier;

receiving an interfering signal in the one or more data bursts on a second subchannel of the quadrature modulated carrier;

computing a power imbalance ratio indicative of a power distribution between the first and second subchannels; and if the power imbalance ratio meets a threshold:
    generating a first channel estimate for the first subchannel;
    demodulating the desired signal using the first channel estimate to obtain first demodulated soft bits corresponding to the desired signal;
    generating a second channel estimate for the first subchannel based on the interfering signal;
    demodulating the desired signal using the second channel estimate to obtain second demodulated soft bits corresponding to the desired signal; and
    combining the first and second demodulated soft bits to obtain combined demodulated soft bits.

2. The method of claim 1 wherein receiving the desired signal on the first subchannel of the quadrature modulated carrier comprises receiving the desired signal on one of an in-phase component and a quadrature component of the quadrature modulated carrier, and wherein receiving the interfering signal on the second subchannel of the quadrature modulated carrier comprises receiving the interfering signal on the other one of the in-phase component and the quadrature component of the quadrature modulated carrier.

3. The method of claim 1 wherein generating the first channel estimate comprises generating the first channel estimate from training symbols in the desired signal.

4. The method of claim 1 wherein generating the second channel estimate based on the interfering signal comprises generating the second channel estimate from training symbols in the interfering signal.

5. The method of claim 4 wherein generating the second channel estimate from training symbols in the interfering signal comprises:
    generating a third channel estimate for the second subchannel from the training symbols in the interfering signal; and
    transforming the third channel estimate to obtain the second channel estimate.

6. The method of claim 1 wherein generating the second channel estimate based on the interfering signal comprises generating the second channel estimate from demodulated soft bits corresponding to the interfering signal.

7. The method of claim 6 wherein generating the second channel estimate from the demodulated soft bits corresponding to the interfering signal comprises:
    generating a third channel estimate for the second subchannel using the demodulated soft bits corresponding to the interfering signal; and
    transforming the third channel estimate to obtain the second channel estimate.

8. The method of claim 7 wherein generating the third channel estimate for the second subchannel using demodulated soft bits corresponding to the interfering signal comprises generating the third channel estimate using demodulated soft bits located near an end of the one or more data bursts.

9. The method of claim 1 wherein generating the first channel estimate comprises generating the first channel estimate from training symbols in the interfering signal.

10. The method of claim 9 wherein generating the second channel estimate based on the interfering signal comprises generating the second channel estimate from demodulated soft bits corresponding to the interfering signal.

11. The method of claim 10 wherein generating the second channel estimate from the demodulated soft bits corresponding to the interfering signal comprises:
    generating a third channel estimate for the second subchannel using demodulated soft bits corresponding to the interfering signal; and
    transforming the third channel estimate to obtain the second channel estimate.

12. The method of claim 11 wherein generating the third channel estimate for the second subchannel using demodulated soft bits corresponding to the interfering signal comprises generating the third channel estimate using demodulated soft bits located near an end of the one or more data bursts.

13. The method of claim 1 wherein demodulating the desired signal using the first channel estimate comprises:
    whitening the desired signal based on the first channel estimate to obtain a first whitened desired signal; and
    demodulating the first whitened desired signal.

14. The method of claim 13 wherein demodulating the desired signal using the second channel estimate comprises:
    whitening the desired signal based on the second channel estimate to obtain a second whitened desired signal; and
    demodulating the second whitened desired signal.

15. The method of claim 1 further comprising canceling interference in the desired signal attributable to the interfering signal before demodulating the desired signal using either the first channel estimate or the second channel estimate.

16. A wireless terminal comprising:
    receiver circuits configured to receive a quadrature modulated carrier containing a desired signal on a first subchannel of the quadrature modulated carrier and an interfering signal on a second subchannel of the quadrature modulated carrier; and
    a processing circuit configured to:
        compute a power imbalance ratio indicative of a power distribution between the first and second subchannels; and
        if the power imbalance ratio meets a threshold:
            generate a first channel estimate for the first subchannel;
            demodulate the desired signal using the first channel estimate to obtain first demodulated soft bits corresponding to the desired signal;
            generate a second channel estimate for the first subchannel based on the interfering signal;
            demodulate the desired signal using the second channel estimate to obtain second demodulated soft bits corresponding to the desired signal; and
            combine the first and second demodulated soft bits to obtain combined demodulated soft bits.

17. The wireless terminal of claim 16 wherein the receiver circuits are configured to receive the desired signal on one of an in-phase component and a quadrature component of the quadrature modulated carrier, and to receive the interfering signal on the other one of the in-phase component and the quadrature component of the quadrature modulated carrier.

18. The wireless terminal of claim 16 wherein the processing circuit comprises a first channel estimation circuit configured to generate the first channel estimate from training symbols in the desired signal.

19. The wireless terminal of claim 18 wherein the processing circuit further comprises a second channel estimation circuit configured to generate the second channel estimate from training symbols in the interfering signal.

20. The wireless terminal of claim 19 wherein the second channel estimation circuit is configured to:
   generate a third channel estimate for the second subchannel from the training symbols in the interfering signal; and
   transform the third channel estimate to obtain the second channel estimate.

21. The wireless terminal of claim 18 wherein the processing circuit further comprises a second channel estimation circuit configured to generate the second channel estimate using demodulated soft bits corresponding to the interfering signal.

22. The wireless terminal of claim 19 wherein the second channel estimation circuit is configured to generate the second channel estimate from demodulated soft bits located near an end of one or more data bursts.

23. The wireless terminal of claim 22 wherein the second channel estimation circuit is configured to:
   generate the third channel estimate for the second subchannel using demodulated soft bits corresponding to the interfering signal; and
   transform the third channel estimate to obtain the second channel estimate.

24. The wireless terminal of claim 16 wherein the processing circuit comprises a first channel estimation circuit is configured to generate the first channel estimate from training symbols in the interfering signal.

25. The wireless terminal of claim 24 wherein the processing circuit further comprises a second channel estimation circuit is configured to generate the second channel estimate from demodulated soft bits corresponding to the interfering signal.

26. The wireless terminal of claim 25 the second channel estimation circuit is configured to:
   generate a third channel estimate for the second subchannel using demodulated soft bits corresponding to the interfering signal; and
   transform the third channel estimate to obtain the second channel estimate.

27. The wireless terminal of claim 26 wherein the second channel estimation circuit is configured to generate the third channel estimate for the second subchannel using demodulated soft bits located near an end of one or more data bursts.

28. The wireless terminal of claim 16 further comprising a first whitening filter to whiten the desired signal using the first channel estimate to obtain a first whitened desired signal and a first demodulator to demodulate the first whitened desired signal.

29. The wireless terminal of claim 28 further comprising a second whitening filter to whiten the desired signal using the second channel estimate to obtain a second whitened desired signal and a second demodulator to demodulate the second whitened desired signal.

30. The wireless terminal of claim 16 further comprising an interference cancellation circuit configured to cancel interference in the desired signal attributable to the interfering signal before demodulation of the desired signal using either the first channel estimate or the second channel estimate.

* * * * *

UNITED STATES PATENT AND TRADEMARK OFFICE
CERTIFICATE OF CORRECTION

PATENT NO. : 8,934,589 B2  
APPLICATION NO. : 13/904905  
DATED : January 13, 2015  
INVENTOR(S) : Jacob Page 1 of 1

It is certified that error appears in the above-identified patent and that said Letters Patent is hereby corrected as shown below:

In the specification,

In Column 6, Line 48, delete "a is a" and insert -- $\alpha$ is a --, therefor.

In Column 7, Line 20, delete "GSM)" and insert -- GSM --, therefor.

In Column 9, Lines 37-38, delete "signal)" and insert -- signal --, therefor.

In the claims,

In Column 15, Line 27, in Claim 24, delete "circuit is" and insert -- circuit --, therefor.

In Column 16, Line 1, in Claim 25, delete "circuit is" and insert -- circuit --, therefor.

Signed and Sealed this  
First Day of March, 2016

Michelle K. Lee  
*Director of the United States Patent and Trademark Office*